(12) United States Patent
Regenor et al.

(10) Patent No.: US 11,660,813 B2
(45) Date of Patent: May 30, 2023

(54) GALACTIC EXTRUSION MANUFACTURING SYSTEM

(71) Applicant: VeriTX Corp., Buffalo, NY (US)

(72) Inventors: James Allen Regenor, East Aurora, NY (US); Jason Jones, East Aurora, NY (US)

(73) Assignee: VeriTX Corp., Buffalo, NY (US)

( * ) Notice: Subject to any disclaimer, the term of this patent is extended or adjusted under 35 U.S.C. 154(b) by 0 days.

(21) Appl. No.: 17/534,882

(22) Filed: Nov. 24, 2021

(65) Prior Publication Data

US 2023/0087830 A1    Mar. 23, 2023

Related U.S. Application Data (60) Provisional application No. 63/246,457, filed on Sep. 21, 2021.

(51) Int. Cl.
| | |
|---|---|
| *B29C 64/259* | (2017.01) |
| *B33Y 30/00* | (2015.01) |
| *B29C 64/30* | (2017.01) |
| *B28B 1/00* | (2006.01) |
| *B22F 12/80* | (2021.01) |
| *B22F 12/50* | (2021.01) |

(Continued)

(52) U.S. Cl.
CPC .......... *B29C 64/259* (2017.08); *B22F 10/85* (2021.01); *B22F 12/50* (2021.01); *B22F 12/80* (2021.01); *B28B 1/001* (2013.01); *B29C 64/30* (2017.08); *B33Y 30/00* (2014.12); *B33Y 40/00* (2014.12); *B28B 17/0081* (2013.01); *B29C 64/393* (2017.08); *B33Y 50/02* (2014.12)

(58) Field of Classification Search
None
See application file for complete search history.

(56) References Cited

U.S. PATENT DOCUMENTS

| | | | |
|---|---|---|---|
| 10,654,596 B1 * | 5/2020 | Eller | ........................ B64G 1/66 |
| 10,899,477 B2 * | 1/2021 | Snyder | .................. B29C 64/118 |

(Continued)

OTHER PUBLICATIONS

Ken Douglas, 3DP in Zero-G, 3D Printing in Space: 10+ Projects to Watch in 2021, avail at https://all3dp.com/2/3d-printing-in-space-projects/, Jan. 17, 2021) (Year: 2021).*

*Primary Examiner* — Yung-Sheng M Tsui
(74) *Attorney, Agent, or Firm* — Woods Oviatt Gilman LLP; Katherine H. McGuire, Esq.

(57) ABSTRACT

A galactic extrusion manufacturing (GEM) system for performing an extrusion process includes an extruder assembly for extruding building material during the extrusion process, and a connection system including a robotic arm-tether-crimper for attachment of the GEM system to space bound vehicles and/or structures in space or on orbit. The extrusion assembly includes an extruder head outfitted with multiple different heads for shaping the building material during the extrusion process, at least one power cartridge, and at least one building material cartridge containing the building material, wherein the power cartridge and the building material cartridge are removable and replaceable. Also provided are a building material cartridge for use with a GEM system or a dispensing control unit (DCU) to perform an extrusion process, and a smart extrusion system including a building material cartridge and a DCU.

18 Claims, 5 Drawing Sheets

(51) Int. Cl.
    *B33Y 40/00*        (2020.01)
    *B22F 10/85*        (2021.01)
    *B28B 17/00*        (2006.01)
    *B33Y 50/02*        (2015.01)
    *B29C 64/393*      (2017.01)

(56) References Cited

U.S. PATENT DOCUMENTS

| | | | |
|---|---|---|---|
| 11,014,303 B1* | 5/2021 | Higham | B29C 64/118 |
| 11,228,115 B2* | 1/2022 | Hoyt | H01Q 19/185 |
| 2015/0231826 A1* | 8/2015 | Snyder | B29C 64/321 |
| | | | 425/130 |
| 2016/0067919 A1* | 3/2016 | Hoyt | B29C 70/205 |
| | | | 425/375 |
| 2017/0240298 A1* | 8/2017 | Goehlich | B33Y 10/00 |
| 2018/0141161 A1* | 5/2018 | Elmer | B33Y 40/10 |
| 2018/0281303 A1* | 10/2018 | Yerazunis | B29C 64/118 |
| 2019/0027835 A1* | 1/2019 | Hoyt | H01Q 15/14 |

* cited by examiner

GALACTIC EXTRUSION MANUFACTURING SYSTEM

FIELD OF THE INVENTION

The present invention generally relates to an extrusion manufacturing system for building or repairing structures in deep space or on orbit, and more particularly to a galactic extrusion manufacturing system including an extruder assembly with self-contained building material cartridges coupled thereto.

BACKGROUND OF THE INVENTION

Weld repair, using Earth bound techniques in the Space environment has been an ever evolving research topic. The extrusion of weld wire from a welding machine could be considered an additive extrusion technique—however, it is and will only ever primarily be used in a repair, maintenance, and overhaul capacity. The extrusion of a material with the intent to build something new, is possible both inside and outside of a vehicle traveling in space or on orbit. Extrusion printing inside of a vehicle is likely to have a more controlled environment, while extrusion printing outside of the vehicle is likely to be a harsher environment.

NASA and likely all of the major space agencies have all theorized producing hardware, physical structures, or function items in space. But extrusion of non-metallics has been a topic of little mention. Non-metallics, which typically imply but are not limited to polymers, are prone to off gassing in low pressure/vacuum like environments. This can lead to contamination if inside a vehicle and if in close proximity to the exterior of a vehicle, could lead to contamination of surfaces which rely on clean clear optics for various sensing perspectives. Curing or cross linking of certain polymers in a vacuum like environment, which is also cold, could be problematic. Polymers also typically become brittle at cryogenic temperatures. Extrusion could be metallic, however there would need to be a high intensity energy source to allow for the metallic material to be plastic enough to be extruded and or fuse the metallic extrusion if in a particulate form during extrusion.

Thus, it would be advantageous to develop an improved extrusion manufacturing system for building or repairing structures in space that provides the programmable capability to extrude various different building materials in different combinations and/or shapes, with different extruder heads that are interchangeable and a quick connect system for attachment of removable/replaceable building material cartridges and/or other types of cartridges, such as fuel or batteries.

SUMMARY OF THE INVENTION

The present invention addresses the above needs by providing a galactic extrusion manufacturing (GEM) system for performing an extrusion process, the GEM system including an extruder assembly for extruding building material during the extrusion process, and a connection system including a robotic arm-tether-crimper for attachment of the GEM system to space bound vehicles and/or other structures in space or on orbit. The extruder assembly may include a plurality of self-contained cartridges coupled thereto, including one or more building material cartridges containing building materials for an extrusion process.

In some example embodiments, the extrusion assembly includes an extruder head outfitted with multiple different heads for shaping the building material during the extrusion process, at least one power cartridge, and at least one building material cartridge containing the building material, wherein the power cartridge and the building material cartridge are removable and replaceable.

In some example embodiments, the building material cartridge includes a diaphragm separating internal chambers of the building material cartridge, a first internal chamber on a first side of the diaphragm, a first fill port connected to the first internal chamber, charge media, wherein the first fill port enables the first internal chamber to be filled with the charge media, a second internal chamber on a second side of the diaphragm, a second fill port connected to the second internal chamber, and building material, wherein the second fill port enables the second internal chamber to be filled with the building material.

In some example embodiments, the building material cartridge physically possess a mounting feature for attaching the building material cartridge to the extruder assembly or another space bound vehicle.

In some example embodiments, the charge media is a gas or an incompressible liquid, and the first fill port is hermetically sealed or welded shut after being filled with the charge media.

In some example embodiments, the second fill port is a connector that is adapted for quick coupling with the extrusion assembly, such that the building material cartridge is an integrated sub-system of the GEM system, and the second fill port is further configured to expel the building material during the extrusion process, wherein the expulsion of the building material through the second fill port is adapted to extrude in any desired shape via the multiple different heads of the extrusion assembly.

In some example embodiments, the multiple different heads and the building material cartridge of the extruder assembly enable on command expulsion with different parameters for different building materials.

In some example embodiments, the GEM system further includes a tether mechanism for tethering built material (completed structures) in space and on orbit back to the vehicle in space or on orbit.

In some example embodiments, the GEM system further includes a resupply mechanism for delivering one or more of the power cartridges and/or the building material cartridges to another GEM system, a specific location in space or on orbit, or a space station. In some other example embodiments, the extrusion assembly is configured to receive replacement cartridges while in space or on orbit from a resupply satellite or another GEM system.

According to another aspect of the present invention, a building material cartridge is provided for use with a galactic extrusion manufacturing (GEM) system or a dispensing control unit (DCU) to perform an extrusion process. The building material cartridge includes a first internal chamber on a first side of the building material cartridge, a first fill port connected to the first internal chamber, charge media, wherein the first fill port enables the first internal chamber to be filled with the charge media, a second internal chamber on a second side of the building material cartridge, a second fill port connected to the second internal chamber, and building material, wherein the second fill port enables the second internal chamber to be filled with the building material.

In some example embodiments, the building material cartridge is a single piece monolithic construction with an integral diaphragm that separates the first internal chamber and the second internal chamber. In some other example embodiments, the building material cartridge is a multi-piece construction in which the first internal chamber and the second internal chamber are discrete compartments.

In some example embodiments, the building material cartridge further includes a mounting feature for attaching the building material cartridge to an extrusion assembly of the GEM system or another space bound vehicle.

In some example embodiments, the charge media is a gas or an incompressible liquid, and the first fill port is hermetically sealed or welded shut after the first internal chamber is filled with the charge media.

In some example embodiments, the second fill port is a connector that is adapted for quick coupling with the extrusion assembly, such that the building material cartridge is an integrated sub-system of the GEM system, and the second fill port is further configured to expel the building material during the extrusion process, wherein the expulsion of the building material through the second fill port is adapted to extrude in any desired shape via multiple different heads of an extruder head of the extrusion assembly, wherein the different extruder heads and the building material cartridge of the GEM system enable on command expulsion with different parameters for different building materials.

In some other example embodiments, the second fill port is a connector that is adapted for quick coupling with the dispense control unit (DCU), wherein the DCU includes an integrated processor and wireless communications module, such that the DCU and the building material cartridge form a stand-alone smart cartridge for performing the extrusion process, and the second fill port is further configured to expel the building material during the extrusion process, wherein the expulsion of the building material through the second fill port is adapted to extrude in any desired shape via a quick connect nozzle attached to the DCU, wherein the DCU and the building material cartridge enable on command expulsion with different parameters for different building materials.

According to another aspect of the present invention, a smart extrusion system is provided for performing a galactic extrusion process, the smart extrusion system including a building material cartridge as described above, and a dispense control unit (DCU) coupled to the building material cartridge, wherein the DCU includes an integrated processor and wireless communications module for enabling on command extrusion of the building material through a quick connect nozzle attached to the DCU during the galactic extrusion process.

In some example embodiments, the DCU is a quick connect system which meters out the building material in the second internal chamber of the building material cartridge on command.

In some example embodiments, the DCU allows for extrusion of the building material from the building material cartridge through interchangeable quick connect nozzles on command and with different parameters for different building materials, without a dedicated extruder assembly.

According to another aspect of the present invention, a galactic extrusion manufacturing (GEM) system is provided including an extruder assembly outfitted with multiple different heads for shaping building material during an extrusion process, wherein at least some of the heads have different shapes and/or sizes from each other, respectively, and a plurality of building material cartridges as described above coupled to the extruder assembly, wherein at least some of the building material cartridges contain different building materials from each other, respectively.

Objects and advantages of the present invention will become apparent from the following description taken in connection with the accompanying drawings, wherein is set forth by way of illustration and example, embodiments of this invention.

BRIEF DESCRIPTION OF THE DRAWINGS

The accompanying drawings form a part of this specification and are to be read in conjunction therewith, wherein like reference numeral are employed to indicate like parts in the various views, and wherein.

DETAILED DESCRIPTION OF THE INVENTION

The present invention is described below in enabling detail by the following examples, which may represent more than one example embodiment of the present invention.

Generally, the systems and methods described herein may be implemented in hardware, software, and/or a combination thereof, and functionality may be distributed across a variety of computing devices. The present invention provides a computer-implemented method programmed for execution in a computing environment. An exemplary system 1 that may be used to implement the methods and aspects described herein may include one or more computing devices, one or more memories storing computer-executable instructions (e.g., software/programs/applications) and processor(s) for executing the instructions, and may be in communication with each other via a system bus or over a network via wired and/or wireless connections. It is also contemplated that system 1 may communicate with one or more remote computers, controllers, or servers that is/are accessible by the computing devices through a network to store and execute any of the functionality and processes described below.

Figure 1:
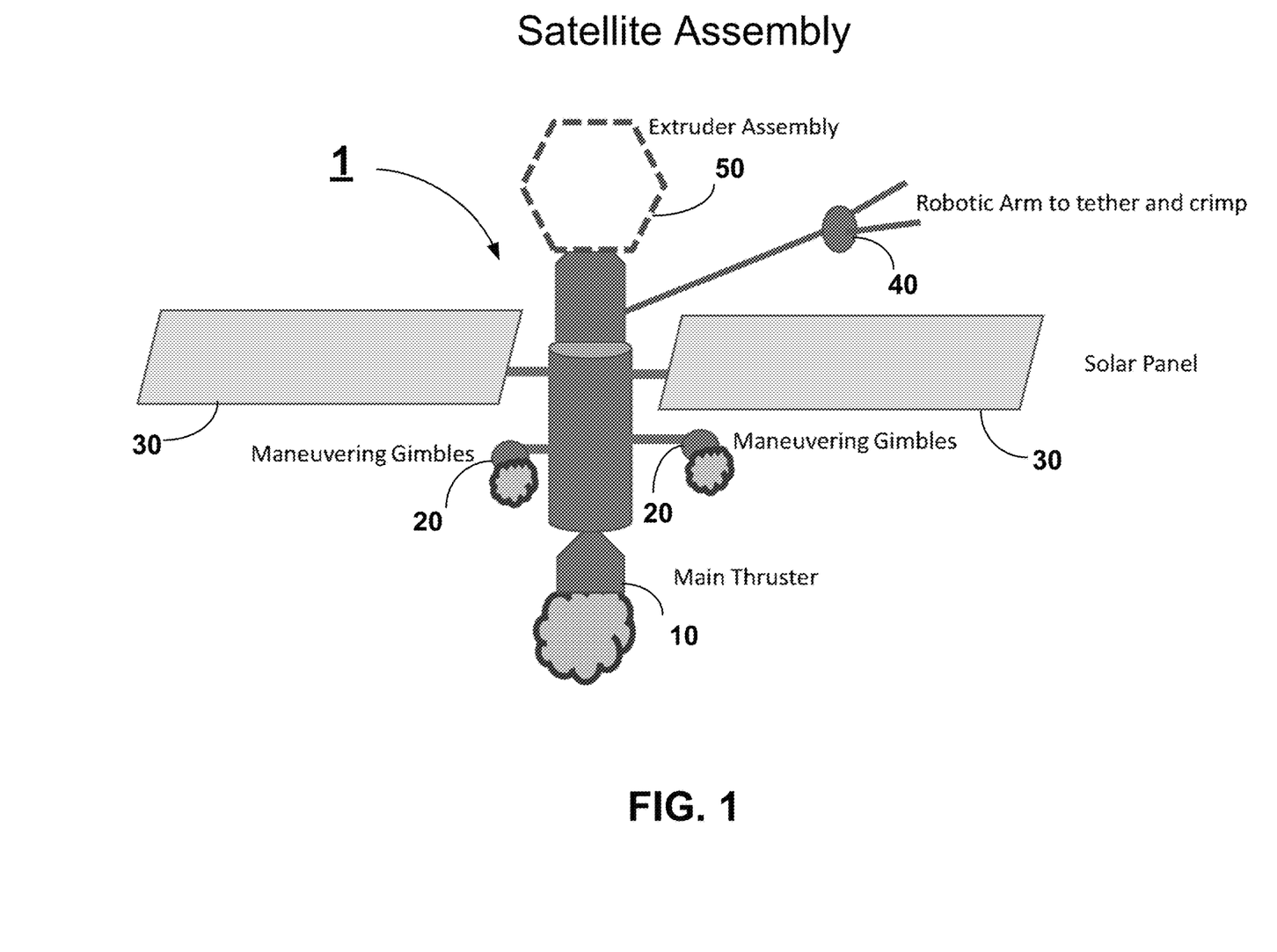
FIG. 1 shows an example embodiment of a galactic extrusion manufacturing system including an extruder assembly, a robotic arm-tether-crimper, and a connection system for attachment to space bound vehicles.

Referring to FIG. 1, a galactic extrusion manufacturing (GEM) system 1 according to some example embodiments includes an extruder assembly 50 and a robotic arm to tether and crimp 40 (also referred to herein as robotic arm-to-tether-crimper 40), which is a connection system for attachment to space bound vehicles and/or other structures in space or on orbit. Robotic arm-to-tether-crimper 40 may comprise a robotic arm and/or a crimping device, for example. In some example embodiments, a tethering mechanism, robotic arm, and crimp could also each be individual features of the GEM system 1 (mounted on the vehicle/ chassis/mechanism). In addition, the GEM system 1 may include a main thruster 10 for movement of the system in space and maneuvering gimbles 20 for more precise positional control, as well as one or more solar panels 30 for powering the system and its components. Extruder assembly 50 is shown with broken lines in FIG. 1, and additional details associated with extruder assembly 50 will be described further below with reference to FIG. 2. Although not shown in FIG. 1, it should also be appreciated that the GEM system 1 may comprise various other power modules, communications modules, computers, antennas, structures, and/or customized modules.

In some example embodiments, the GEM system 1 may be implemented in any LargeSat (greater than 150 kg) or SmallSat (less than 150 kg) size space vehicle, including but not limited to a microsatellite, a nanosatellite, or a CubeSat (also referred to as U-class interplanetary spacecraft). In the specific case of a CubeSat, physical parameters of payloads may be 3 U (6 kg), 6 U (12 kg), 12 U (24 kg), or 27 U (54 kg), for example, although other "U-class" sizes within this range are also possible in other deployments. SmallSat vehicles such as micro- and nano-satellites are inherently lighter and, in most scenarios, lower cost to launch. Smaller vehicles can also be more agile and disposable, therefore SmallSat embodiments are likely to be the target size.

In some example embodiments, the GEM system 1 is a satellite assembly that is adapted to build new structures and/or repair existing structures on orbit or in deep space, using the extruder assembly 50 and the integrated robotic arm-tether-crimper 40. The GEM system can be used while detached from a launch vehicle which delivered it. The extruder assembly 50 may use removable and replaceable self-contained power and building material cartridges, and may have multiple heads for shaping the building material.

The GEM system 1 is configured to receive instructions, build parameters, and designs from a manufacturing execution system (not shown in the figures) for on command operation to perform an extrusion process. Additionally or alternatively, the GEM system 1 could also be programmed to operate independently, if required by the mission, for example. In some example embodiments, blockchain may be utilized for data, process, and performance integrities.

Figure 2:
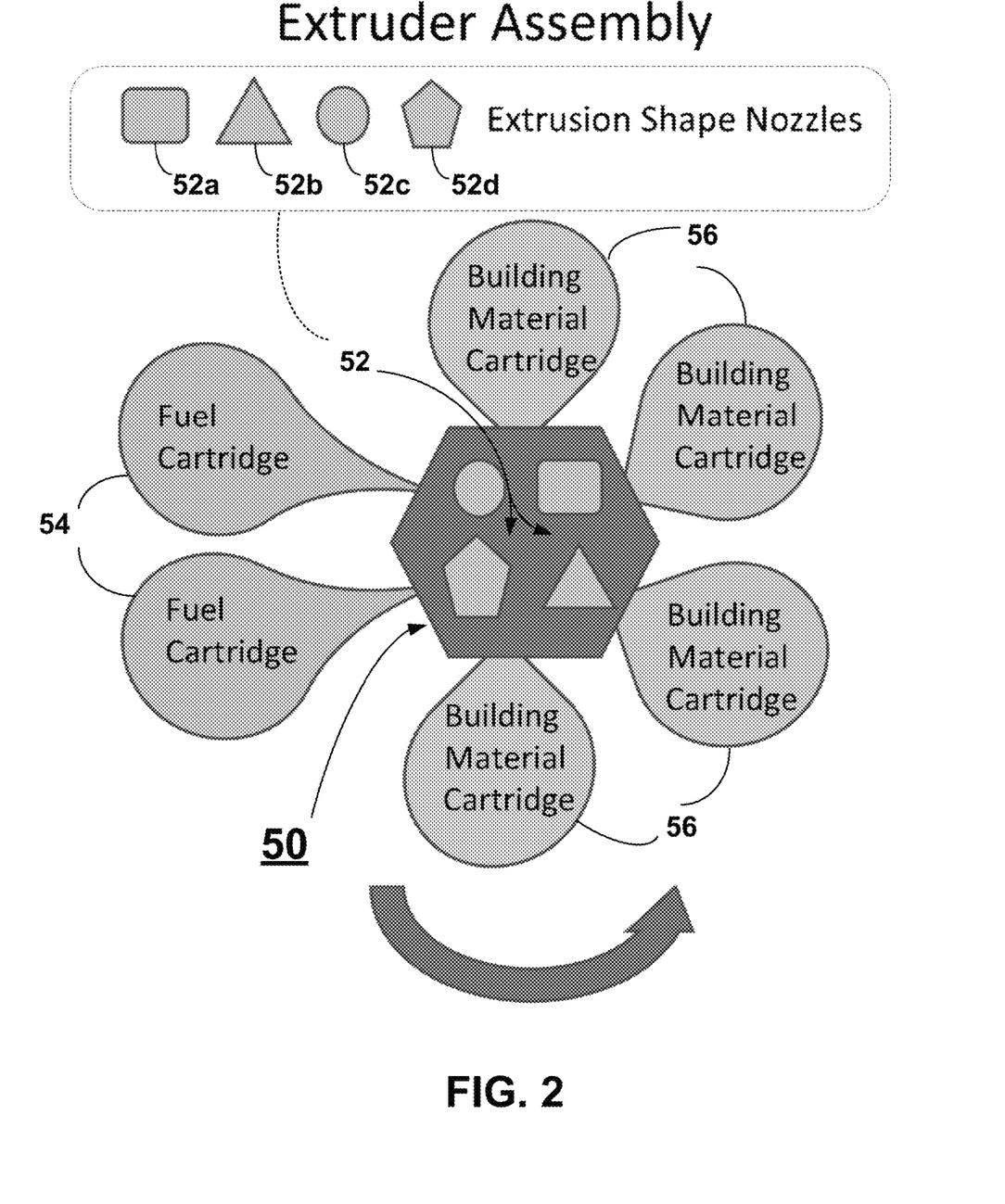
FIG. 2 shows an example embodiment of an extruder assembly of the galactic extrusion manufacturing system of FIG. 1, including a plurality of cartridges.

Referring to FIG. 2, extruder assembly 50 may comprise an extruder head 52 and a plurality of self-contained cartridges coupled to the extruder assembly 50, and the cartridges are removable and replaceable. The plurality of cartridges may include one or more power cartridges 54 and/or one or more building material cartridges 56, for example.

In some example embodiments, the power cartridges 54 may be fuel cartridges (e.g., fuel cells) or battery cartridges (e.g., battery packs). In some example embodiments, building material cartridges 56 may be cartridges containing various different types of building materials. Exemplary building materials include but are not limited to polymers, polymer matrix composites, hardenable slurries such as ceramics and ceramic composites, and/or regolith based slurries and metallic materials. In some example embodiments, non-metallics may be used to overcome above-described drawbacks with extrusion of metallics-based building materials in space. Additional details regarding building material cartridges 56 will be described further below with reference to FIG. 3.

The extruder head 52 of the extrusion assembly 50 may be outfitted with multiple different heads (52a, 52b, 52c, 52d, etc.) for shaping the material during the extrusion process. During extrusion, the heads 52 (e.g., extrusion shape nozzles 52a, 52b, 52c, 52d, etc.) of the extrusion assembly 50 can rotate enabling a wave or cable like formation to be created, as well as gradients as one material is transitioned to another material by partially allowing material from two or more building material cartridges 56 to expel material simultaneously. Thus, depending on build requirements, the extrusion assembly 50 can rotate to extrude materials simultaneously to weave or cable materials together, and/or the extrusion assembly 50 can simply remain static and extrude any one material separately in a single stream.

Figure 3:
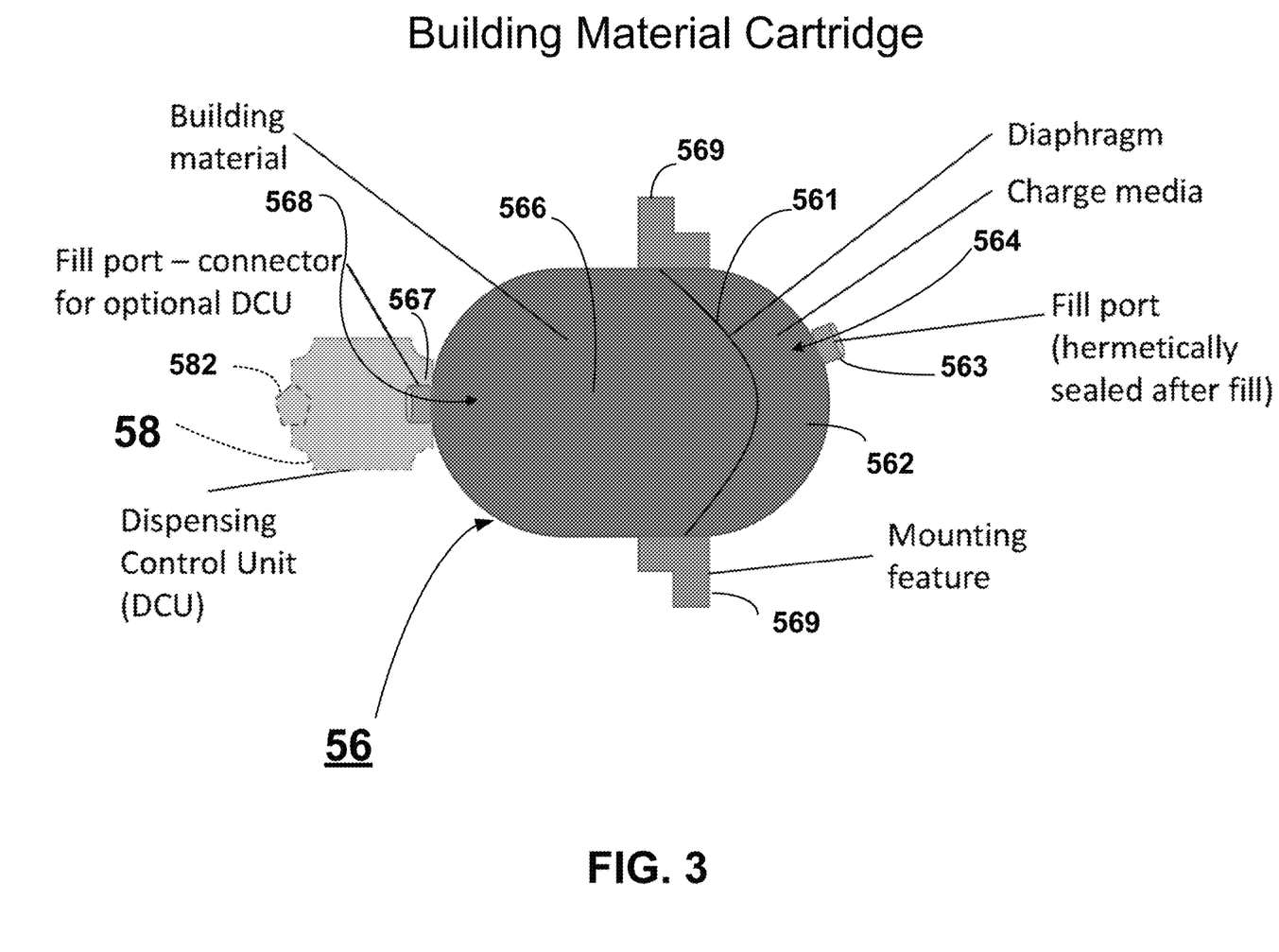
FIG. 3 shows an example embodiment of a building material cartridge for use with the extruder assembly of FIG. 2 and/or an optional dispensing control unit.

Referring to FIG. 3, a building material cartridge (BMC) 56 may include a diaphragm 561 that separates a first internal chamber 562 and a second internal chamber 566. First internal chamber 562 (right side in non-limiting example of FIG. 3) is defined by an outer surface of building material cartridge 56 and diaphragm 561, and has a first fill port 563 connected thereto, through which first internal chamber 562 may be filled with charge media 564. Second internal chamber 566 (left side in non-limiting example of FIG. 3) is defined by the outer surface of building material cartridge 56 and diaphragm 561, and has a second fill port 567 connected thereto, through which second internal chamber 566 may be filled with building material 568.

Building material cartridge 56 may also include a mounting feature 569, which allows for mounting or attachment of building material cartridge 56 to extruder assembly 50, for example. Mounting feature 569 may provide for custom mounting locations and may be adjustable for any space-bound vehicle.

In the example embodiment described above, building material cartridge 56 is a single piece monolithic construction with an integral diaphragm 561 that separates internal compartments 562, 566. However, in some alternative example embodiments, building material cartridge 56 may instead be a multi-piece construction containing one or more discrete chambers, including at least one chamber for housing building materials for use during a galactic extrusion manufacturing process.

First fill port 563 enables first internal chamber 562 to be filled with the charge media 564. The first internal chamber 562 may be filled with the charge media 564 at a launch site or some location in space. In some example embodiments, gas may be the preferred charge media 564 when minimizing launch mass is desired, with gas being the lightest charge media. However, in some other example embodiments, such as when GEM system 1 is reloaded/recharged in space, an incompressible liquid may be the preferred charge media 564, such liquids being easier to load than gas while on orbit or in deep space. First fill port 563 may be hermetically sealed or welded shut after being filled with charge media 564 (e.g., to prevent any off-gassing during transit to orbit or deep space), although this is not a requirement.

Second fill port 567 enables second internal chamber 566 to be filled with the building material 568. The second internal chamber 566 may be filled with the building material 568 at the launch site or some location in space. In some example embodiments, polymers or polymer matrix composites may be the preferred building material 568. However, in some other example embodiments, hardenable slurries such as ceramics and ceramic composites and/or regolith based slurries and metallic materials may be the preferred building material 568. Various other suitable building materials are also contemplated within the scope of the present disclosure.

Second fill port 567 is further configured to dispense (output or expel) building material during an extrusion process. Extrusion through the same opening (second fill port 567) can be adapted to extrude in any desired shape, via the different heads 52 (e.g., extrusion shape nozzles 52a, 52b, 52c, 52d, etc.) of extruder assembly 50.

In some example embodiments, building material cartridges 56 may be integrated with GEM system 1, with building material cartridges 56 being controlled by GEM system 1 and cooperating with extrusion heads 52 of extruder assembly 50 to perform a galactic extrusion manufacturing process. For example, second fill port 567 is configured to connect with extruder assembly 50 (not shown in FIG. 3), through which building material 568 will be dispensed (expelled or output) via heads 52 during the extrusion process. Thus, second fill port 567 may be a connector or quick-coupler adapted to connect with a vehicle-run extrusion system (e.g., extruder assembly 50 of GEM system 1), such that the galactic BMC 56 is integrated in the GEM system 1. Such example embodiments (integrated BMC as sub-system of GEM system) do not require a separate dispensing controller coupled to second fill port 567 in order to control the extrusion process.

However, building material cartridge 56 may optionally be functional as a stand-alone smart cartridge, independent of GEM system 1, with building material cartridge 56 being controlled by a dedicated dispensing controller. Therefore, in some other example embodiments, building material cartridge 56 may optionally be connected or coupled to a dispense control unit (DCU) 58 (as shown in FIG. 3), which includes a processor 582 (e.g., an integrated chip and circuitry) and a wireless communications module 586, which may utilize radio frequency (RF) communications technologies, light-based (LiFi) wireless communications technologies, directed energy communications technologies, or the like.

The processor 582 and wireless communications module 586 of DCU 58 working together with building material cartridge 56 allows for on command expulsion of building materials from building material cartridge 56, optionally with different expulsion parameters for different materials. The DCU 58 is a quick connect system which meters out building material on command, and allows for extrusion of the building material from building material cartridge 56 without requiring an extrusion device (e.g., such as extruder assembly 50 of FIGS. 1-2). Extrusion through the same opening (second fill port 567) can also be adapted to extrude in any desired shape via one or more different interchangeable head(s) 582 (e.g., quick connect extrusion nozzles) of DCU 58. Thus, second fill port 567 may be a connector or quick coupler adapted to connected with an optional dispensing controller (e.g., DCU 58), such that building material cartridge 56 is coupled to DCU 58. DCU 58 has the same connection to building material cartridge 56 as GEM system 1. However, such example embodiments (stand-alone BMC with DCU) can function independently of any vehicle-run extrusion system (such as extruder assembly 50 of GEM system 1).

Thus, in an alternative example embodiment, a smart extrusion system 2 may comprise a galactic building material cartridge (BMC) 56 and a dispensing control unit (DCU) 58 as shown in FIG. 3, in a discrete apparatus that may be operated independently of GEM system 1 and its extruder assembly 50 as shown in FIGS. 1-2. Also, it should be appreciated that DCU 58 is shown with broken lines in FIG. 3 to indicate that DCU 58 is optional according to different example embodiments described above.

Figure 4:
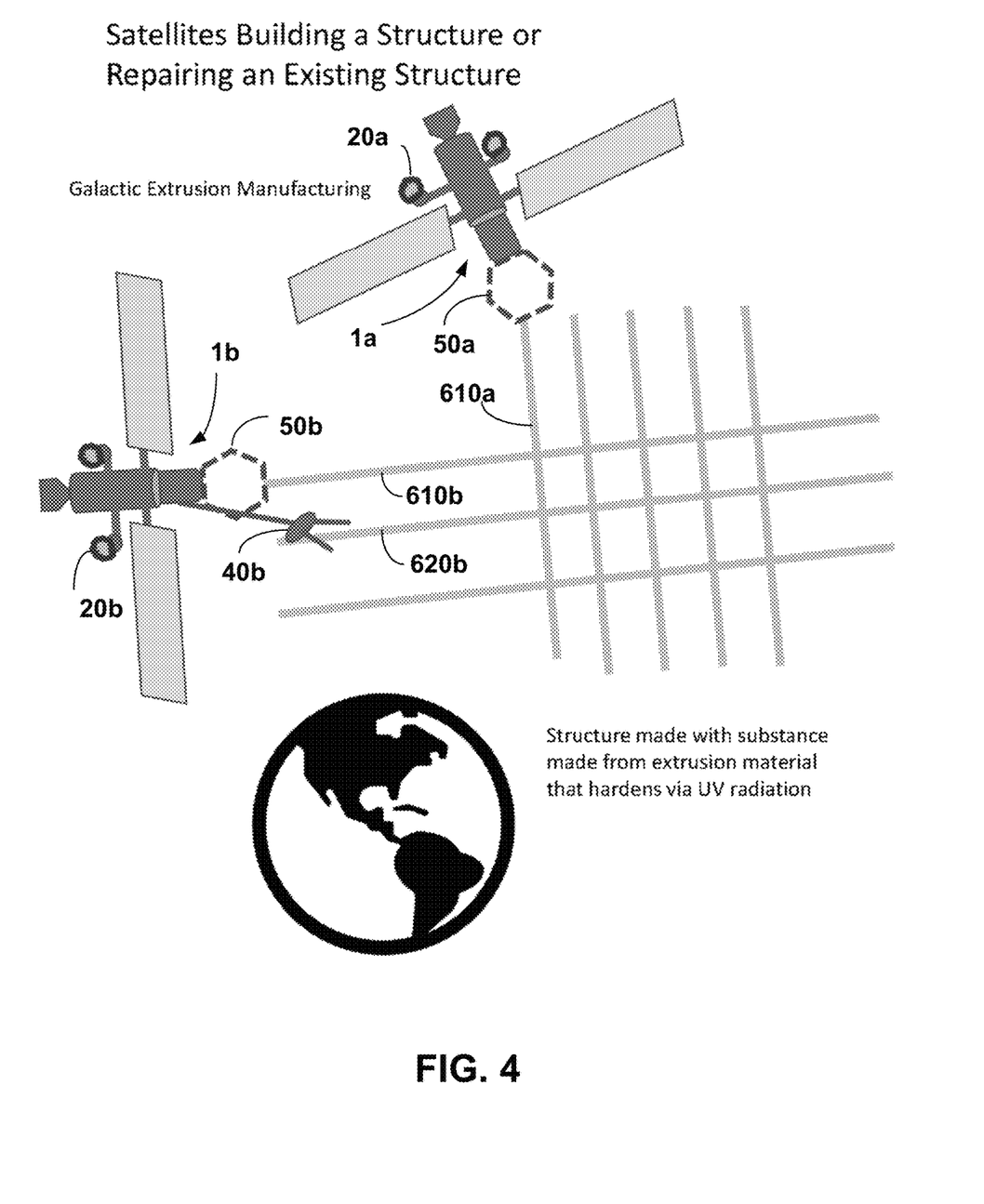
FIG. 4 shows an example embodiment of building or repairing a structure with one or more galactic extrusion manufacturing systems according to FIGS. 1-3, including a tether mechanism for tethering built materials of the structure to at least one of the galactic extrusion manufacturing systems.

Referring to FIG. 4, GEM systems 1a, 1b can utilize extrusion assemblies 50a, 50b to produce built material 610a, 610b, 620b, etc., respectively. In some example embodiments, GEM system 1b may include a tether mechanism 40b for tethering built materials 610, 620 (e.g., partially or fully completed structures) in space and on orbit back to the vehicle in space or on orbit (tethered to GEM system 1b). Such structures may be built with one or more substance(s) (e.g., building material(s)) made from extrusion material that hardens via UV radiation, for example.

Additionally, GEM system 1 can function as a "resupply satellite" according to some example embodiments. GEM system 1 can also de-orbit (or be de-orbitted), and drop ship self-contained building materials 56 to physical locations (e.g., the Moon, Mars) and/or dock with a larger space vehicle (e.g., the International Space Station (ISS)) to deliver self-contained building materials 56. In some example embodiments, a de-orbiting feature may be an inherent capability of the GEM system 1, while in some other example embodiments, an external mechanism may be coupled to the GEM system 1 to provide the ability to be de-orbitted.

Figure 5:
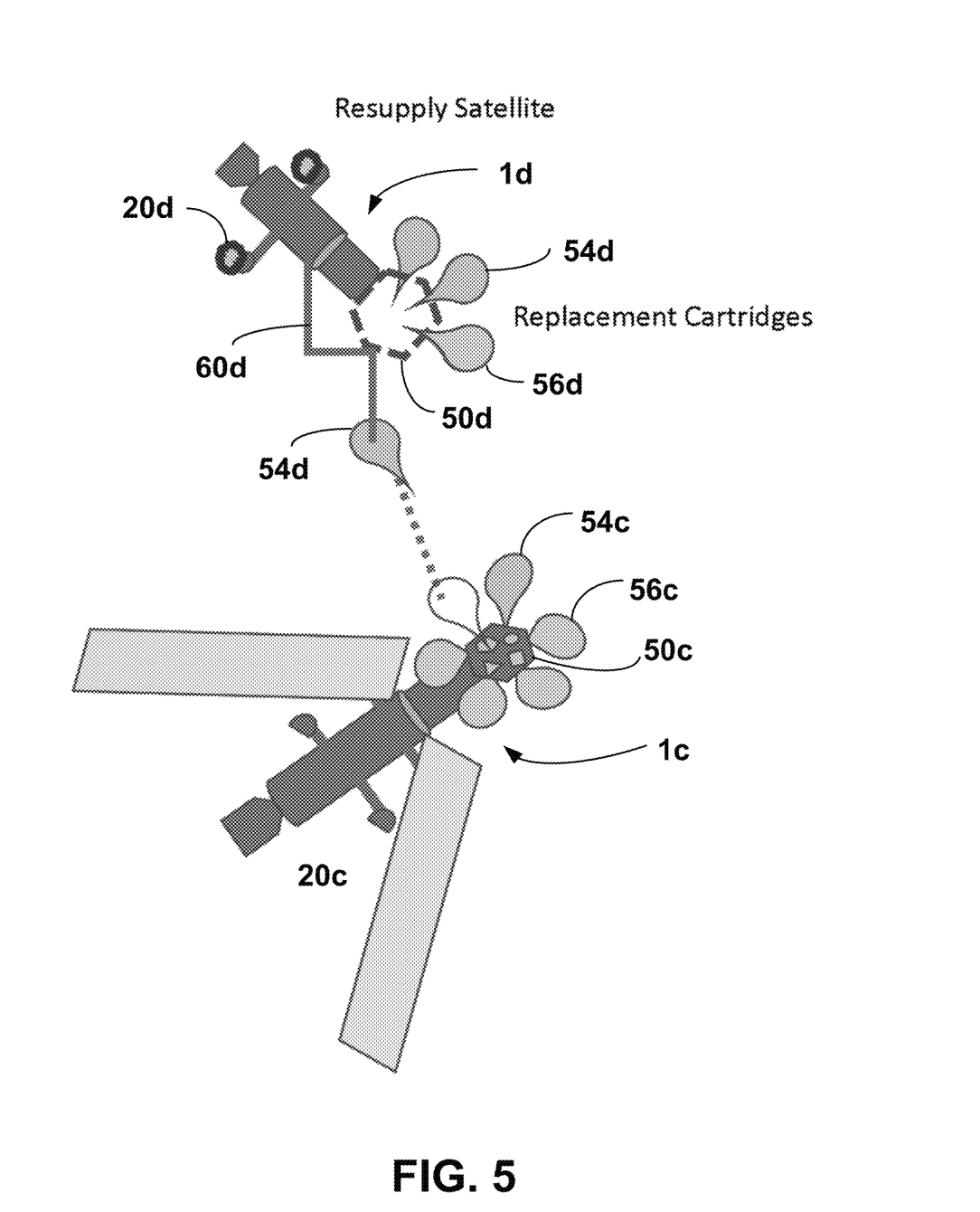
FIG. 5 shows an example embodiment of changing power and/or building material cartridges of the extruder assembly according to FIGS. 1-3.

Referring to FIG. 5, GEM system 1d can function as a resupply satellite to allow GEM system 1c to change its cartridges (e.g., power/fuel/battery cartridges 54 and building materials 56). For example, when one or more cartridges 54c and/or 56c of extrusion assembly 50c of GEM system 1c are depleted, GEM system 1c is adapted to receive replacement cartridges 54d and/or 56d from GEM system 1d (resupply satellite) while in space or on orbit. In some example embodiments, GEM system 1d may include a resupply mechanism 60d for delivering replacement cartridges 54d, 56d to GEM system 1c. Thus, GEM system 1 (e.g., 1c, 1d) can provide the ability to change fuel/battery cartridges 54 and/or building material cartridges 56 while in space or on orbit via the resupply satellite functionality.

As described above with reference to FIGS. 1-5, the galactic extrusion manufacturing system enables building or repairing structures in space by providing the programmable capability to extrude various different building materials in different combinations and/or shapes, with different extruder heads that are interchangeable and a quick connect system for attachment of removable/replaceable building material cartridges and/or other types of cartridges, such as fuel or batteries. The building materials cartridges have a unique design, and can be used within the GEM system or on its own with an integrated DCU for controlling the extrusion process. The GEM system can also function as a resupply satellite to transfer or receive self-contained cartridges that are removable/replaceable to or from other GEM systems or similar satellites. The GEM system may also have a tethering mechanism for attachment of built materials (partially or fully completed structures back to the GEM system while in deep space or on orbit.

An exemplary computing environment can be used to implement any of the processing described above. The computing environment may include one or more computers, input/output devices, memories, processors (e.g., CPUs, microprocessors), displays with graphical user interfaces (GUIs), and the like, which allow for implementation of the present invention. Other peripheral devices (e.g., USB drives) may be connected to the computers to transfer information (e.g., files, documents, images, text, data, instructions, messages, etc.) to and from the computers. The system memories may include various non-transitory computer-readable media including program modules, data structures, application programs, operating systems, and other data for the computers, as known in the relevant art. The computers may operate in a networked environment using logical connections with each of the system components described above. Known network interfaces provide communication paths between the computers and allows for the methods described above to be performed.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

While the invention has been described with reference to example embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A galactic extrusion manufacturing (GEM) system for performing an extrusion process, wherein the GEM system comprises:
   an extruder assembly for extruding building material during the extrusion process comprising:
      an extruder head outfitted with multiple different heads for shaping the building material during the extrusion process;
      at least one power cartridge; and
      at least one building material cartridge containing the building material, and comprising:
         a diaphragm separating internal chambers of the building material cartridge,
         a first internal chamber on a first side of the diaphragm,
         a first fill port connected to the first internal chamber,
         charge media, wherein the first fill port enables the first internal chamber to be filled with the charge media,
         a second internal chamber on a second side of the diaphragm,
         a second fill port connected to the second internal chamber, and building material, wherein the second fill port enables the second internal chamber to be filled with the building material,
      wherein the power cartridge and the building material cartridge are removable and replaceable; and
   a connection system, including a robotic arm-tether-crimper, configured for attachment of the GEM system to space bound vehicles and other structures in space or on orbit.

2. The GEM system according to claim 1, wherein the building material cartridge physically possesses a mounting feature for attaching the building material cartridge to the extruder assembly or another space bound vehicle.

3. The GEM system according to claim 1, wherein the charge media is a gas or an incompressible liquid, and the first fill port is hermetically sealed or welded shut after being filled with the charge media.

4. The GEM system according to claim 1, wherein the second fill port is a connector that is adapted for quick coupling with the extrusion assembly, such that the building material cartridge is an integrated sub-system of the GEM system, and
the second fill port is further configured to expel the building material during the extrusion process, wherein the expulsion of the building material through the second fill port is adapted to extrude in any desired shape via the multiple different heads of the extrusion assembly.

5. The GEM system according to claim 1, wherein the multiple different heads and the building material cartridge of the extruder assembly enable on command expulsion with different parameters for different building materials.

6. The GEM system according to claim 1, further including a tether mechanism for tethering built material or completed structures in space and on orbit back to the vehicle in space or on orbit.

7. The GEM system according to claim 1, further including a resupply mechanism for delivering one or more of the power cartridges and/or the building material cartridges to another GEM system, a specific location in space or on orbit, or a space station.

8. The GEM system according to claim 1, wherein the extrusion assembly is configured to receive replacement cartridges while in space or on orbit from a resupply satellite or another GEM system.

9. A building material cartridge configured for use with the galactic extrusion manufacturing (GEM) system of claim 1 to perform an extrusion process, wherein the building material cartridge comprises:
   a first internal chamber on a first side of the building material cartridge,
   a first fill port connected to the first internal chamber,
   charge media, wherein the first fill port enables the first internal chamber to be filled with the charge media,
   a second internal chamber on a second side of the building material cartridge,
   a second fill port connected to the second internal chamber, and
   building material, wherein the second fill port enables the second internal chamber to be filled with the building material.

10. The building material cartridge according to claim 9, wherein
   the building material cartridge is a single piece monolithic construction with an integral diaphragm that separates the first internal chamber and the second internal chamber, or
   the building material cartridge is a multi-piece construction in which the first internal chamber and the second internal chamber are discrete compartments.

11. The building material cartridge according to claim 9, wherein the building material cartridge physically possesses a mounting feature for attaching the building material cartridge to an extrusion assembly of the GEM system or another space bound vehicle.

12. The building material cartridge according to claim 9, wherein
   the charge media is a gas or an incompressible liquid, and the first fill port is hermetically sealed or welded shut after the first internal chamber is filled with the charge media.

13. The building material cartridge according to claim 11, wherein
the second fill port is a connector that is adapted for quick coupling with the extrusion assembly, such that the building material cartridge is an integrated sub-system of the GEM system, and
the second fill port is further configured to expel the building material during the extrusion process, wherein the expulsion of the building material through the second fill port is adapted to extrude in any desired shape via multiple different heads of an extruder head of the extrusion assembly,
wherein the different extruder heads and the building material cartridge of the GEM system enable on command expulsion with different parameters for different building materials.

14. The building material cartridge according to claim 9, wherein
the second fill port is a connector that is adapted for quick coupling with the dispense control unit (DCU), wherein the DCU includes an integrated processor and wireless communications module, such that the DCU and the building material cartridge form a stand-alone smart cartridge for performing the extrusion process, and
the second fill port is further configured to expel the building material during the extrusion process, wherein the expulsion of the building material through the second fill port is adapted to extrude in any desired shape via a quick connect nozzle attached to the DCU,
wherein the DCU and the building material cartridge enable on command expulsion with different parameters for different building materials.

15. A smart extrusion system for performing a galactic extrusion process, the smart extrusion system comprising:
the building material cartridge according to claim 9, and
a dispense control unit (DCU) coupled to the building material cartridge, wherein the DCU includes an integrated processor and wireless communications module for enabling on command extrusion of the building material through a quick connect nozzle attached to the DCU during the galactic extrusion process.

16. The smart extrusion system according to claim 15, wherein the DCU is a quick connect system which meters out the building material in the second internal chamber of the building material cartridge on command.

17. The smart extrusion system according to claim 15, wherein the DCU allows for extrusion of the building material from the building material cartridge through interchangeable quick connect nozzles on command and with different parameters for different building materials, without a dedicated extruder assembly.

18. A galactic extrusion manufacturing (GEM) system comprising:
an extruder assembly outfitted with multiple different heads for shaping building material during an extrusion process, wherein at least some of the heads have different shapes and/or sizes from each other, respectively, and
a plurality of building material cartridges according to claim 9 coupled to the extruder assembly, wherein at least some of the building material cartridges contain different building materials from each other, respectively.

* * * * *